(12) United States Patent
  Krämer

(10) Patent No.: US 10,910,623 B2
(45) Date of Patent: **\*Feb. 2, 2021**

(54) BOARD FOR ELECTRICALLY SECURED CONNECTION OF BATTERY CELLS AND BATTERY

(71) Applicant: E-Seven Systems Technology Management Ltd, Valletta (MT)

(72) Inventor: Thomas Krämer, St. Julian's (MT)

(73) Assignee: E-Seven Systems Technology Management Ltd., Valletta (MT)

( \* ) Notice: Subject to any disclaimer, the term of this patent is extended or adjusted under 35 U.S.C. 154(b) by 0 days.

This patent is subject to a terminal disclaimer.

(21) Appl. No.: 16/401,982

(22) Filed: May 2, 2019

(65) Prior Publication Data

US 2019/0260006 A1    Aug. 22, 2019

Related U.S. Application Data

(63) Continuation of application No. PCT/EP2017/071731, filed on Aug. 30, 2017.

(30) Foreign Application Priority Data

Nov. 2, 2016  (DE) .......................... 10 2016 120 838

(51) Int. Cl.
  *H01M 2/20* (2006.01)
  *H01M 10/613* (2014.01)
  (Continued)

(52) U.S. Cl.
  CPC ........... *H01M 2/206* (2013.01); *H01M 2/105* (2013.01); *H01M 2/1077* (2013.01);
  (Continued)

(58) Field of Classification Search
  CPC .... H01M 2/1077; H05K 1/115; H05K 1/0298
  See application file for complete search history.

(56) References Cited

U.S. PATENT DOCUMENTS

2013/0034751 A1   2/2013 Geng
2013/0122341 A1   5/2013 De Paoli et al.
  (Continued)

FOREIGN PATENT DOCUMENTS

CN    102916158 A   2/2013
CN    105552289 A   5/2016
  (Continued)

*Primary Examiner* — Stephan J Essex
(74) *Attorney, Agent, or Firm* — Reinhart Boerner Van Deuren P.C.

(57) ABSTRACT

A board for electrically secured connection of battery cells. The board is partially formed from a non-electrically conductive material, and the board has at least two contacting sections on a first side and a contacting section on a second side. On the first side, a connecting section connects the contacting sections to one another, and an electrical fuse is assigned to each of the contacting sections. The connecting section is connected to each contacting section via an electrical fuse assigned to this contacting section. The connecting section is connected to the contacting section on the second side of the board through the non-conductive material of the board via an electrically conductive lead-through element, so that each contacting section on the first side of the board is secured against each other contacting section on the first side and the second side of the board by at least one electrical fuse.

15 Claims, 3 Drawing Sheets

(51) Int. Cl.
*H01M 10/643* (2014.01)
*H01M 10/6555* (2014.01)
*H01M 2/10* (2006.01)

(52) U.S. Cl.
CPC ......... *H01M 2/204* (2013.01); *H01M 10/613* (2015.04); *H01M 10/643* (2015.04); *H01M 10/6555* (2015.04)

(56) References Cited

U.S. PATENT DOCUMENTS

2013/0136955 A1    5/2013  Chuang et al.
2017/0005316 A1*  1/2017  Harris ................... H01M 2/206

FOREIGN PATENT DOCUMENTS

| | | |
|---|---|---|
| EP | 2 343 752 A2 | 7/2011 |
| JP | 2015-513205 A | 4/2015 |
| WO | WO 2011/149076 A1 | 12/2011 |
| WO | WO 2015/164593 A1 | 10/2015 |

* cited by examiner

BOARD FOR ELECTRICALLY SECURED CONNECTION OF BATTERY CELLS AND BATTERY

CROSS-REFERENCE TO RELATED PATENT APPLICATIONS

This patent application is a continuation of PCT/EP2017/071731, filed Aug. 30, 2017, which claims priority to German Application No. 10 2016 120 838.8, filed Nov. 2, 2016, the entire teachings and disclosure of which are incorporated herein by reference thereto.

FIELD

The present invention concerns a board for electrically secured connection of battery cells, wherein the board is partially formed from a non-electrically conductive material, wherein the board has at least two electrically and thermally conductive contacting sections on a first side and at least one electrically and thermally conductive contacting section on a second side, wherein on the first side, an electrically and thermally conductive connecting section is arranged, which electrically and thermally conductively connects the contacting sections to one another on the first side, and wherein an electrical fuse is assigned to each of the contacting sections on the first side and the connecting section is connected to each contacting section via an electrical fuse assigned to this contacting section.

BACKGROUND

From the state of the art it is known that battery cells within a battery can be electrically and thermally connected to each other via a board. Such a board can be suitable for connecting several battery cells in series and in parallel electrically and thermally conductively. This allows an electric current and a heat current to be distributed as evenly as possible within the battery. Such a board may have at least one fuse. Thus the battery cells can be electrically secured against each other by means of the board. This is particularly advantageous if a resistance of a battery cell breaks down due to a defect, so that an excessively high electrical current flows through this battery cell. In this case, an electrical fuse is triggered which is assigned to a contacting section of the board, which contacting section is electrically and thermally conductively connected to a positive or negative end terminal of the battery. As a result, the defective battery cell is electrically isolated and other battery cells inside the battery are protected from excessive electrical current.

The boards from the prior art are configured such that they are suitable for electrically securing battery cells against each other, which are electrically and thermally conductively connected to contact sections on one side of the board. As the contact sections are only secured against the connecting section on the first side of the board, the contact sections on the first side of the board are not electrically secured against the contact sections on the second side of the board.

BRIEF SUMMARY

The present invention is therefore based on the object of providing a board which provides an electrical fuse for the contacting sections on the first side of the board to the contacting sections on the second side of the board. The object is solved by a board of the aforementioned type, wherein according to the invention the connecting section is electrically conductively connected to the at least one contacting section on the second side of the board through the non-conductive material of the board via an electrically conductive lead-through element, so that each contacting section on the first side of the board is secured against each other contacting section on the first side of the board and against each contacting section on the second side of the board by at least one electrical fuse. Consequently, an electrical protection of all contacting sections is provided. Due to the arrangement according to the invention, it is avoided that an unnecessarily large number of fuses have to be provided on the board. In particular, the arrangement according to the invention does not require that conductive lead-through elements, which connect the contacting sections of the first side and the second side of the board with each other, must be dimensioned as fuses. The non-electrically conductive material is preferably planar and arranged between the contacting sections. According to the invention, the non-electrically conductive material can be made of a common substrate material that is used for boards or circuit boards. The electrically and thermally conductive contacting sections, the electrically and thermally conductive connecting section and the electrically and thermally conductive lead-through elements are preferably made of a metal. Here, copper is particularly preferred. This is advantageous because copper has particularly good electrical and thermal conductivity. The board can be produced at a reasonable price using production methods for circuit boards known to the person skilled in the art.

According to a particular design of the invention, each contacting section on the first side of the board is separated from the connecting section by a non-electrically conductive section on the first side of the board and connected to the connecting section by a conductor track passing through the non-electrically conductive section, the conductor track being dimensioned such that the conductor track serves as the fuse assigned to the respective contacting section. According to the invention, the non-electrically conductive section can be arranged in a circle around the contacting section, through which the conductor path is passed from the contacting section to the connecting section. The fuse prevents an excessively high electrical current from being led into or out of a contacting region.

The fuse is preferably formed by an electrically and thermally conductive material, which is dimensioned in such a way that it burns through or is damaged by an excessive electrical current. The electrically and thermally conductive material of the fuse must have a sufficiently small conductive cross section to ensure that the fuse triggers in the event of an excessive electrical current flowing through a contacting section. In accordance with the invention, the fuse should be dimensioned such that it has a maximum conductive cross section suitable for ensuring maximum thermal conductivity of the fuse, whereby the maximum conductive cross section is limited by the maximum conductive cross section which ensures triggering of the fuse in the event of a defect in a battery cell.

The connecting section is preferably formed as a planar, electrically and thermally conductive layer on the first side of the board. If the connecting section is formed as a planar layer, then it has a very high electrical and thermal conductivity and is therefore particularly suitable for distributing an electrical and a thermal current between the contacting sections on the first side of the board. Alternatively, the connecting section can be configured as a composite of conductor tracks which are electrically and thermally conductively connected to one another. The advantage of a composite of conductor tracks is that less electrically and thermally conductive material has to be used for the connecting section. Additional space remains on the board for other components that can be arranged on the non-conductive material.

If the connecting section is configured as a composite of conductor tracks which are electrically and thermally conductively connected to one another, then preferably each conductor track is configured as a closed conductor loop enclosing a contacting section. Preferably the conductor loop is circular. It is also possible, however, that the conductor loop has a shape different from that of a circle, such as an elliptical shape, a rectangular shape or a bone shape.

It is advantageous if the at least one contacting section is arranged on the second side of the board in a planar, electrically and thermally conductive connecting and contacting region on the second side of the board. If the connecting and contacting region on the second side of the board is formed as a planar layer, it has a very high electrical and thermal conductivity and is therefore particularly suitable for distributing an electrical and thermal current between the contacting sections on the second side of the board. However, the connecting and contacting region can also be configured differently. Thus, configurations are also possible in which the second side has a connecting section and contacting sections which is arranged in a mirror image to the connecting section and the contacting sections on the first side of the board. According to the invention, a fuse can also be assigned to each contacting section on the second side of the board. However, fuses on the at least one contacting section on the second side of the board are not absolutely necessary, as it has turned out that in the event of a defect, the fuses arranged on the first side of the board are sufficient to adequately protect battery cells electrically and thermally connected to the board. For this reason, a configuration of the invention with a planar connecting and contacting region is preferred, in which contacting sections are not separated from the connecting and contacting region in a particular manner.

According to a particular configuration of the invention, the connecting section on the first side is connected to the connecting and contacting region on the second side through the electrically non-conductive material. Thus it is not necessary that the connecting section on the first side of the board is directly connected to a contacting region on the second side in an electrically and thermally conductive manner via a contacting element. Instead, there may be an electrically and thermally conductive connection between the connecting section on the first side and the connecting and contacting region on the second side. An electrical and a thermal current can be conducted by the connecting and contacting region to at least one contacting section on the second side of the board.

According to a further configuration of the invention, around each contacting section on the first side of the board, a plurality of lead-through elements are arranged uniformly spaced apart from the contacting section. It has been shown that by providing several lead-through elements, an electrical and thermal current can be conducted particularly well from the first side of the board to the second side of the board. It has been found to be advantageous if the lead-through elements are arranged near the contacting section in the connecting section on the first side of the board. A circular arrangement of the lead-through elements around the contacting sections is particularly suitable. A number of six to twelve lead-through elements has been found to be particularly advantageous.

According to the invention, at least one lead-through element can be arranged on an inner edge of a lead-through recess which passes through the non-conductive material. The recess may be circular or of any other shape. The lead-through element is preferably a metal layer which, according to the invention, can be evaporated or printed onto the inner edge of the lead-through recess. The lead-through recess can be drilled or punched into the non-conductive material. However, the lead-through element may also be configured differently and, in particular, may not necessarily be arranged along a lead-through recess through the non-conductive material. For example, the lead-through element can be inserted into the non-conductive material as a rivet element in accordance with a possible configuration.

According to the invention, the contacting sections can be elevated on the first side and/or on the second side of the board with respect to a plane defined by a surface of the first side or the second side of the board, respectively. An elevated contacting section preferably has a flat surface or a surface with a relief shape adapted to a shape of an end terminal of a battery cell. This improves contacting of the contacting section with a battery cell. The contacting section is preferably configured in such a way that it protrudes between 0.1 mm and 0.3 mm from the plane defined by the surface of the first side or the surface of the second side of the board, respectively.

It is advantageous if the contacting sections have elevated contacting points. The contact points can be used to establish a well-defined electrically and thermally conductive connection between the contact sections and adjacent battery cells.

Preferably the board is flexible. For this purpose, the board can be made of flexible and/or elastic materials. For example, the electrically non-conductive material may be made of an elastic polymer. The electrically non-conductive material can be formed from a polyimide, which is preferably Kapton. Kapton is chemically highly resistant and has very high breakdown field strength. The electrically and thermally conductive material applied to the board, of which the contacting sections, the connecting section on the first side of the board, the connecting and contacting region on the second side of the board and the at least one lead-through element are made, has sufficient flexibility if it is a metal. However, the amount of metal applied should be dimensioned such that it will not be damaged when the board is bent, which could cause sections of the board to diminish or lose their electrical and thermal conductivity.

In accordance with a further embodiment of the invention, the board has, in the non-conductive material, a planar core formed from an electrically and thermally conductive material, wherein the lead-through element extends through the core and is electrically insulated from the core, so that an electrically and thermally conductive connection of the contacting sections on the first side with the contacting sections on the second side is made by the lead-through element and a heat flow can be picked up through the core and dissipated from the board. If the board is provided in a battery between battery cells, not only an electric current and a heat flow can be distributed over the battery, but also picked up by the core. This makes it possible to conduct the heat flow out of the board and thus also out of the cell arrangement. According to the invention, the core can be led out of an edge of the board or can be exposed on the edge. It is also possible that the core is led out or exposed at several edges of the board. If the core is led out of the board, it can form a thermally conductive heat dissipation element in the region in which it is led out of the board. Alternatively, the core can be suitable to be electrically and thermally connected to a thermally conductive heat dissipation element. The heat dissipation element can be connected to a heat sink so that large heat flows from the board can be dissipated via the core.

Particularly preferably, at least one cooling line is provided in the board to cool the board. The cooling line can pass through the board in a plane formed by the board. According to the invention, several cooling lines can be provided in the board. The cooling line can pass through the core of the board according to the invention.

Preferably at least one additional contact is provided on the composite of conductor tracks or on the planar, electrically and thermally conductive layer on the first side of the board and/or on the covering on the second side of the board. Such a contact is not intended to be contacted by a battery cell. A battery management system can be connected to such a contact so that, for example, a voltage applied to the board can be measured.

Preferably at least one further contact is provided on the board. The further contact can be connected, for example, to a measuring device which is mounted on the board or provided in the board. This may be a temperature sensor. In accordance with the invention, the contact can also be used to connect a bus system which can be used to read out and/or control measuring devices provided on the board.

The present invention further concerns a battery having a cell arrangement, wherein the cell arrangement comprises a plurality of battery cells, which are electrically and thermally conductively connected to each in an electrical and thermal series and parallel circuit, wherein the cell arrangement comprising at least two battery sections, each battery section consisting of a plurality of battery cells electrically connected in parallel, wherein each battery cell has a positive and a negative end terminal, the battery cells of the battery sections are aligned such that all the positive end terminals of the battery cells of the respective battery section lie in a common positive contact plane, and that all the negative end terminals of the battery cells of the respective battery section lie in a common negative contact plane, wherein the battery sections are arranged adjacent to one another, wherein in each case a positive contact plane of a battery section faces a negative contact plane of an adjacently arranged battery section, and wherein the contact planes are aligned parallel to one another, wherein an at least partially electrically and thermally conductive connecting plate with a first side and a second side is arranged between at least two successive battery sections, which has on the first side and on the second side in each case at least one thermally and electrically conductive contacting section, wherein the end terminals connected to the at least one contacting section of the first side are electrically and thermally conductively connected to one another via the connecting plate, wherein the end terminals connected to the at least one contacting section of the second side being electrically and thermally conductively connected to one another via the connecting plate, and wherein the end terminals connected to the at least one contacting section of the first side are electrically and thermally conductively connected to the end terminals connected to the at least one contacting section of the second side via the connecting plate. In accordance with the invention, as the connecting plate, the battery has a board that is configured as described above.

The battery contains several battery cells in each battery section. Preferably the battery cells are round cells. These have proven to be particularly resistant to mechanical stresses.

The battery cells have positive and negative end terminals with the positive end terminals in a positive contact plane and the negative end terminals in a negative contact plane. A positive end terminal or a negative end terminal is to be understood as a positive pole or a negative pole of a battery cell, respectively. The positive and negative contact planes are aligned parallel to each other.

The contact sections of the board are electrically and thermally conductively connected to the positive end terminals and to the negative end terminals of the battery cells. The positive end terminals are electrically and thermally conductively connected to each other via the board. The negative end terminals are also electrically and thermally connected to each other via the board. In addition, the positive end terminals and the negative end terminals are electrically and thermally conductively connected to each other via the board. The advantage of such an arrangement is that an electric current and a thermal current can be distributed over the entire cell arrangement by means of the board. With the board, according to the invention, it is ensured that the battery cells within the cell arrangement are electrically protected against each other.

According to the invention, the battery cells can be arranged such that first end terminals of a contacting plane of a first battery section are arranged directly opposite to second end terminals of a contacting plane of a second battery section, so that all the battery cells of a battery section are arranged in alignment with the battery cells of an adjacent battery section. Thus, groups of battery cells of several battery sections are arranged in rows.

Preferably, positive end terminals of a battery section are directly electrically and thermally conductively abutting to negative end terminals of an adjacent battery section. Accordingly, two or more battery cells are connected in series without directly adjacent battery cells being separated from each other by a board. Such a structure can be provided if sufficient distribution of an electric current and a heat flow within a battery is possible even with a small number of boards within the cell array. Whether this is the case is largely determined by the capacitive and other properties of the battery cells.

It is preferred if a battery positive pole and a battery negative pole are defined by the end terminals located in the two outer contact planes of the battery, wherein a respective pressure plate is arranged on the battery positive pole and the battery negative pole, wherein the pressure plates are connected to one another via tension elements and thereby press the battery cells adjacent to the at least one board against the at least one board.

The components within the cell arrangement are thereby pressed together. The pressure plates exert a pressing force on each of the battery cells. According to the invention, the pressure plate can exert the pressure force directly on the battery cells at the battery positive pole or at the battery negative pole. This allows the pressure plate to be applied directly to positive or negative end terminals of the battery cells. Alternatively, the pressure plate can exert the contact force on the battery positive pole or on the battery negative pole indirectly on the battery cells. For example, an additional layer may be provided between the pressure plate and the battery cells in accordance with the invention. This additional layer may be configured electrically non-conductively and/or elastically.

According to the invention, the pressure plates can be planar, but different configurations of pressure plates are also possible. The tension elements are each connected to the pressure plates. Herein, the tension elements are clamped in such a way between the pressure plates that they exert a tensile force on the pressure plates. Due to the tensile force, the pressure plates can in turn exert the already described contact force on the cell arrangement. The contact force is transmitted across all battery sections of the cell arrangement within the battery. Therefore, the battery cells are particularly well contacted with the at least one board within the cell arrangement, as an area between two electrically and/or thermally contacting elements may be enlarged due to the contact force.

The tension elements can be in the form of rods, tubes or other elongated elements. Preferably the rods are made of a metal, particularly made of steel. Alternatively, the rods can also be made of a particularly stable plastic or composite material.

It is advantageous if the pressure plates are configured as metal plates. Metal plates are sufficiently stable so that a tensile force can be transmitted from the tension elements to the cell arrangement. The metal plates can be made with different thicknesses depending on a desired tensile force. If a high tensile force is desired, the metal plate has to be made particularly thick. Preferably, the metal plate is 3 to 20 mm in thickness, most preferably 5 mm in thickness. According to the invention, the metal plates can be formed of copper, aluminum or other very highly thermally conductive material. Alternatively, it is possible not to make the pressure plates of metal. Hence, the pressure plates may be made of a hard plastic according to the invention.

Preferably, the tension elements are passed through tension element recesses in the pressure plates, wherein the tension elements are bolted in the tension element recesses and/or are bolted to the pressure plates by means of nuts. A threaded connection allows a precise adjustment of the tensile forces exerted by the tension elements on the pressure plates. However, according to the invention, other fixing means can also be used in order to fix the tension elements to the tension element recesses in such a way that the tension elements exert a tensile force on the pressure plates.

The cell arrangement can be enclosed by a thermally conductive housing in accordance with the invention. As the housing is thermally conductive, it is suitable for absorbing heat from the cell arrangement as a heat sink and optionally transferring it to other heat sinks to which it is thermally conductively connected. The previously described heat dissipation element can be thermally conductively connected to the housing. The housing is preferably made of a metal, preferably iron, aluminum or a metal alloy. Such a housing is suitable for protecting the cell arrangement from external influences. The housing preferably has two openings on which the pressure plates are placed. The housing may comprise elongated recesses as ventilation slots according to the invention.

BRIEF DESCRIPTION OF THE DRAWING

Further advantageous forms of implementation of the invention are shown in the drawings. Therein.

DETAILED DESCRIPTION

Figure 1:
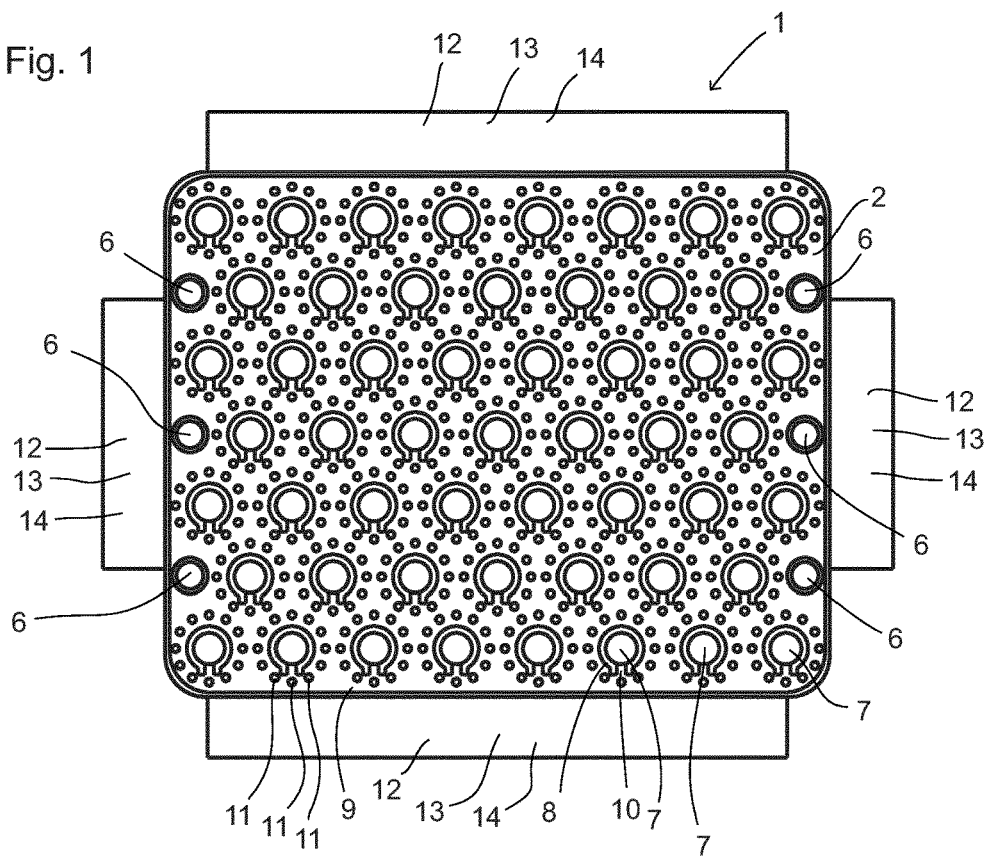
FIG. 1 shows a schematic representation of a board according to the invention in a view on a first side of the board.

FIG. 1 shows a schematic representation of a board 1 according to the invention in a view on a first side 2 of the board. This is a board 1 as part of a cell arrangement 3 with battery cells arranged offset in first cell planes 4 and in second cell planes 5 (not shown). Board 1 is suitable for cell arrangements 3 with seven first and second cell levels 4 and 5, with eight and seven battery cells being arranged in the first and second cell levels 4 and 5, respectively (not shown). Board 1 has tension element recesses 6 through which tension elements (not shown) can pass through.

Board 1 is partly made of an electrically non-conductive material. On the first side of the board 1, copper is applied in a planar manner as an electrically and thermally conductive material to the electrically non-conductive material. The copper material has several contacting sections 7. These are suitable for contacting the end terminals of battery cells. For this purpose, the contacting sections 7 are elevated. The contacting sections 7 are separated from a connecting section 9 by insulating sections 8 made of an electrically non-conductive material. The connecting section 9 is planar. It connects the contacting sections 7 with each other electrically and thermally conductively. An electrically and thermally conductive conductor track 10, which is dimensioned as a fuse, passes through each insulation section 8. Thereby, the contacting sections 7 are electrically secured against each other.

Around each insulation section 8 and thus also around each contacting section 7, several lead-through recesses 11 are arranged in a circular shape. In each lead-through recess 11, a lead-through element (not shown) is arranged that is arranged in a lead-through recess 11. The lead-through element is made of copper and connects the connecting section 9 of the first side 2 of board 1 with a second side (not shown) of board 1 electrically and thermally conductively. A current flowing from a battery cell into a contacting section 7 can thus be passed through the conductor track 10 and the connecting section to the second side of board 1. As the contacting sections 7 on the first side 2 of the board 1 are electrically secured with respect to the connecting section 9, they are also secured against contacting sections (not shown) on the second side of board 1.

In board 1, a core 12 made of copper is situated, which partially extends laterally into regions outside board 1. In these regions outside the board 1, the core 12 forms a heat dissipation element 13. Four heat dissipation elements 13 are shown here, each with a first planar section 14. At each heat dissipation element 13, there is also a second planar section, which is not visible due to the perspective shown.

Figure 2:
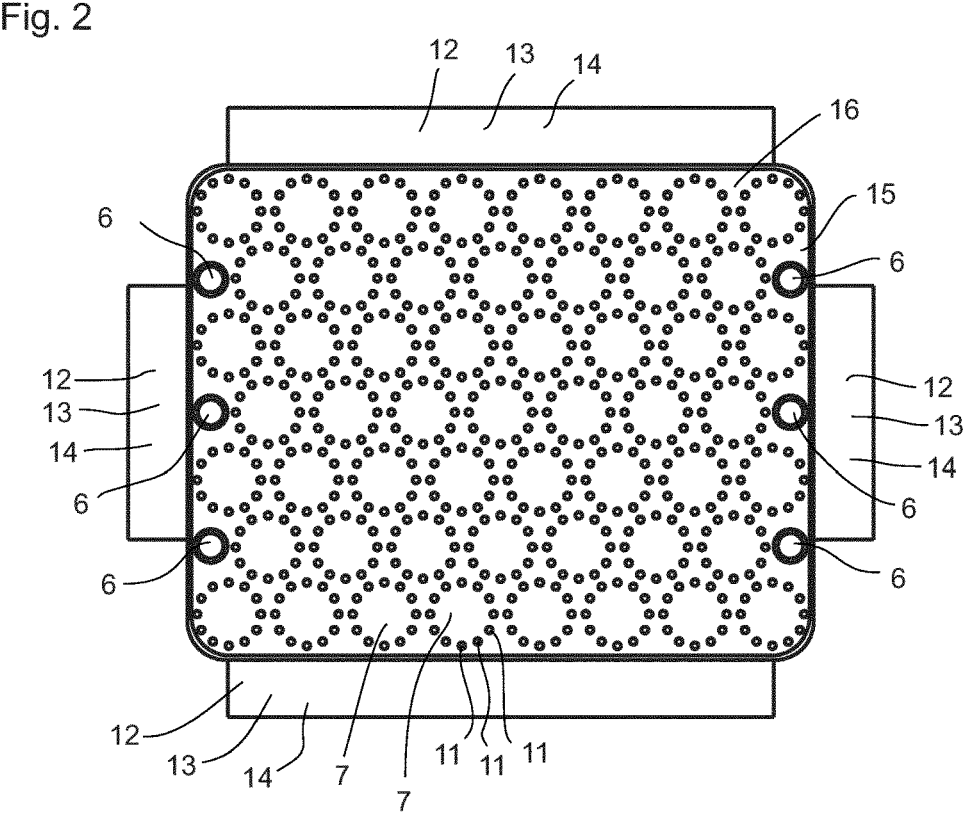
FIG. 2 shows a schematic representation of the board according to FIG. 1 in a view on a second side of the board.

FIG. 2 shows a schematic representation of board 1 according to FIG. 1 in a view on a second side 15 of board 1. On the second side 15 of board 1, there is a copper layer formed as a connecting and contacting region 16. In the connecting and contacting region 16, contacting sections 7 are arranged, which are suitable for contacting with end terminals of battery cells. Around each contacting section 7, several lead-through recesses 11 are arranged in a circular shape. Lead-through elements, which are not shown, are arranged in board 1 in the lead-through recesses 11 as described above.

The four heat dissipation elements 13, each with a first planar section 14, are also shown here. Also on the second side of board 1, the tension element recesses 6 are visible, through which tension elements (not shown) can be passed.

Figure 3:
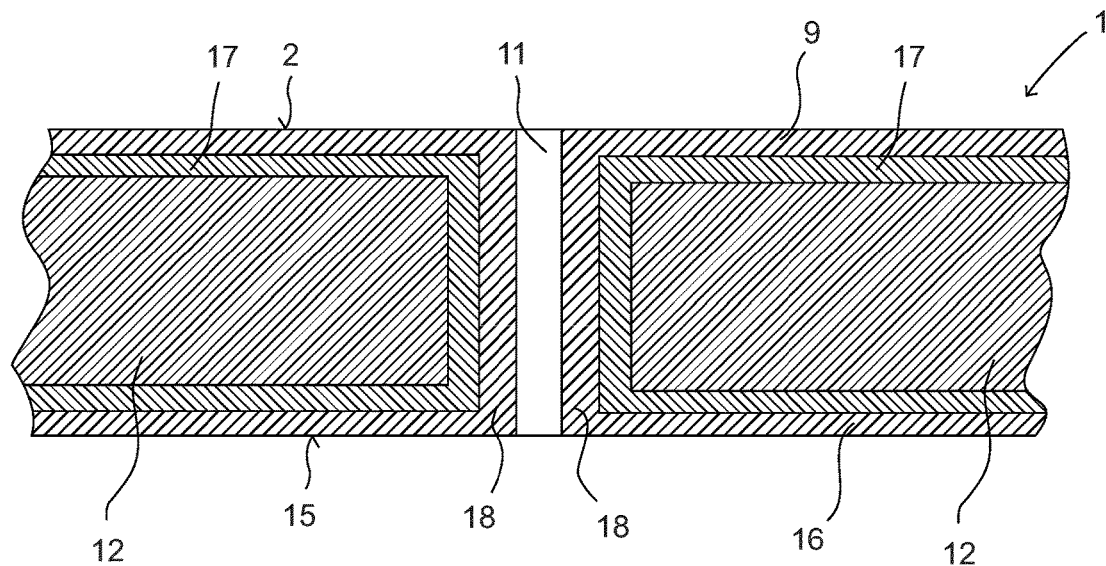
FIG. 3 shows a schematic representation of the board according to FIGS. 1 and 2 with a lead-through recess in a sectional view.

FIG. 3 shows a schematic representation of board 1 according to FIGS. 1 and 2 with a lead-through recess 11 in a sectional view. Board 1 comprises an electrically non-conductive substrate material 17. The substrate material 17 encloses the core 12. On the first side 2 of the board 1, a copper layer forms the connecting section 9. On the second side 15 of the board 1, a copper layer forms the connecting and contacting region 16. A lead-through recess 11 is passed through the board 1. It runs through the connecting section 9 and the connecting and contacting region 16. A lead-through element 18 made of copper is applied to the edge of the lead-through recess 11 as a thin layer in a planar manner. The lead-through element 18 is electrically isolated from the core 12 by the substrate material 17. However, a heat flow can flow through the substrate material 17 and be dissipated from board 1 via core 12.

Figure 4:
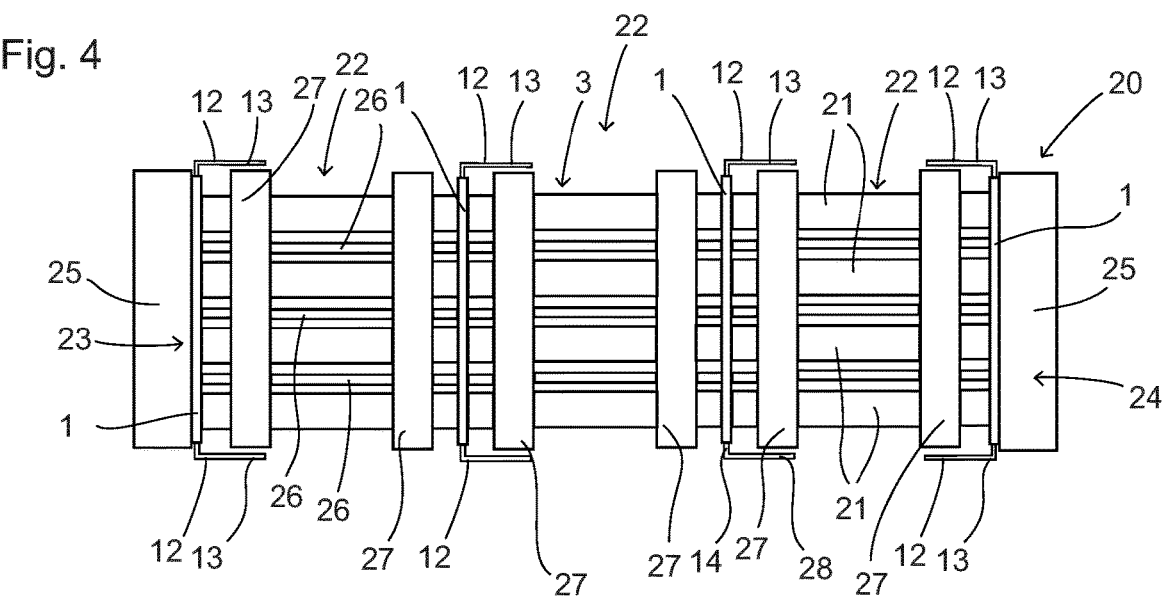
FIG. 4 shows a schematic representation of a cell arrangement of a battery according to the invention with a board.

FIG. 4 shows a schematic representation of a cell arrangement 3 of a battery 20 according to the invention with a board 1. In the cell arrangement 3, several battery cells 21 are arranged next to each other in a battery section 22. The battery cells 21 arranged in a battery section 22 are connected in parallel. A parallel connection of the battery cells 21 is made possible by several boards 1 according to the invention. For this, the end terminals of the battery cells 21 are electrically and thermally conductively connected to the boards 1. The boards 1 are each arranged between two battery sections 22. Each battery section 22 has a height of seven battery cells 21. Battery cells 21 of adjacent battery sections 22 are connected in series by the boards 1 arranged between them. The battery cells 21 in cell arrangement 3 are thus connected to each other both in parallel and in series.

A battery positive pole 23 and a battery negative pole 24 are formed by positive end terminals and by negative end terminals of battery cells 21 in battery 20, respectively. The battery positive pole 23 and the battery negative pole 24 are connected to outer boards 1. The outer boards 1 connect the end terminals of the battery cells 21 electrically and thermally conductively. A pressure plate 25 is each arranged on the side of the outer boards 1 facing away from the battery positive pole 23 and the battery negative pole 24, respectively. The pressure plate 25 is made of copper. It therefore has particularly high heat conductivity. The pressure plate 25 is electrically insulated from the outer boards 1 so that it does not carry any electrical current when the battery 20 is in operation.

The pressure plates 25 are connected to each other by tension elements 26. The tension elements 26 are screwed to the pressure plates 25 in such a way that they exert a tensile force on the pressure plates 25. This compresses the cell arrangement 3. In particular, the battery cells 21 are pressed against the boards 1. This increases the contact area between the end terminals of the battery cells 21 and the boards 1, such that an electric and a thermal current can be distributed better between the battery cells 21 and the boards 1 and thus also distributed better over the entire cell arrangement 3. This avoids local thermal hotspots within the battery 20. Furthermore, due to the cell arrangement 3 being pressed by the tension elements 26 and the pressure plates 25 in accordance with the invention, the battery 20 in accordance with the invention is particularly resistant to mechanical stresses.

In order to ensure that the battery cells 21 are securely held within the cell arrangement 3, the battery cells 21 are enclosed by several positioning plates 27. The positioning plates 27 enclose the battery cells 21 in the battery sections 22 in a form-fitting manner. As a precise contacting of the end terminals of the battery cells 21 to the boards 1 is necessary, the positioning plates 27 are here arranged in the vicinity of the boards 1.

The boards 1 each have a core 12, which is laterally led out of the boards 1. Outside the boards 1, the core 12 forms a respective heat dissipation element 13. Heat can be dissipated from the cell arrangement 3 via the heat dissipation element 13. The heat dissipation element 13 has a first planar section 14 extending in a plane of the board 1 and a second planar section 28 extending in another plane oriented at a right angle to the plane of the board 1. The second planar section 28 is suitable for thermally conductive connection to a housing (not shown) or to a heat sink (not shown), such that a heat flow can be dissipated from board 1 to the housing or to the heat sink, respectively.

Figure 5:
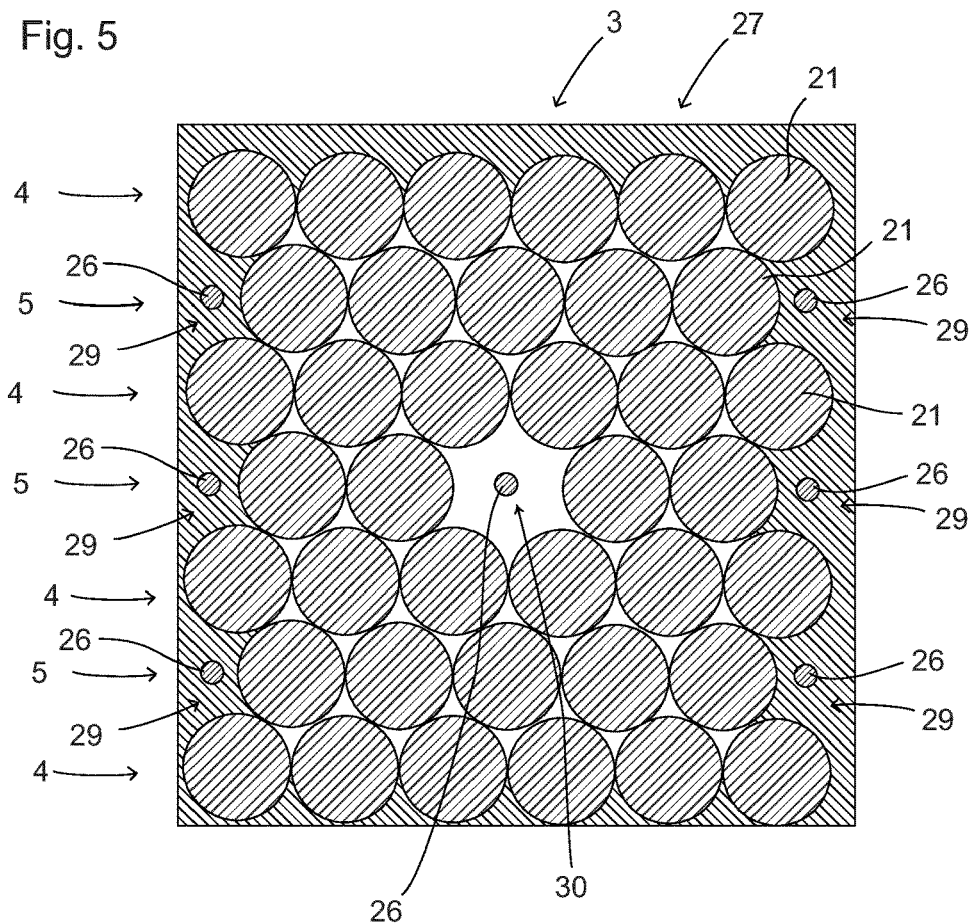
FIG. 5 shows a schematic representation of a section of the cell arrangement of the battery according to FIG. 4 in a sectional view.

FIG. 5 shows a schematic representation of a section of the cell arrangement of the battery 20 according to FIG. 4 in a sectional view. The battery cells 21 are arranged in first cell levels 4 and second cell levels 5. The battery cells 21 are directly adjacent to each other. The second cell levels 5 each have one battery cell 21 less than the first cell levels 4. This results in outer passage sections 29. Tension elements 26 can be passed through the outer passage sections 29. The outer passage sections 29 allow as many battery cells 21 as possible to be arranged on the smallest possible cross-sectional area of a cell arrangement 3. For example, to insert a tension element 26 into the edge area of a battery section 22, it is not necessary to remove an entire battery cell 21. Instead, only a battery cell 21 is removed from a second cell level 5. The removal of one battery cell 21 from the second cell level 5 results in two outer passage sections 29. One or more tension elements 26 can be passed through each outer passage section 29. Here, one tension element 26 is passed through each outer passage section 29. In order to achieve uniform stabilization of the cell arrangement 3, however, an inner passage section 30 is also provided in which no battery cell 21 is arranged. A tension element 26 is passed through the inner passage section 30.

The battery cells 21 are enclosed in the battery section by the positioning plate 27. Tension element recesses 6 are provided in the positioning plate 27, through which the tension elements 26 are passed through into the outer passage sections 29 and into the inner passage section 30.

Figure 6:
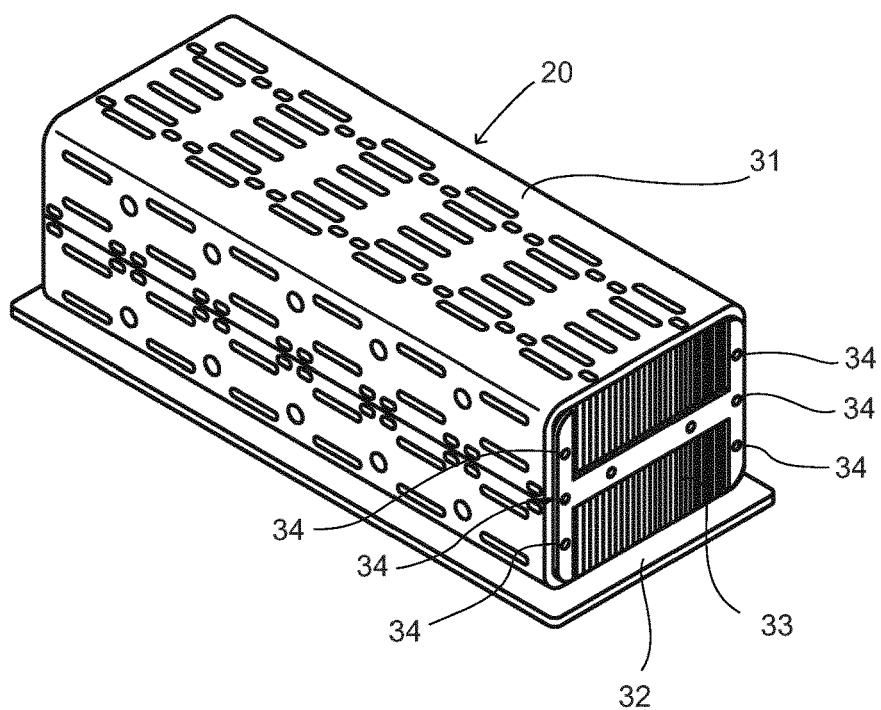
FIG. 6 shows a schematic representation of the battery according to FIG. 4 and FIG. 5 with a housing.

FIG. 6 shows a schematic representation of a battery 20 according to the invention with a housing 31. The housing 31 is made of iron and encloses a cell arrangement 3 according to the invention with boards 1. Inside the housing 31, heat dissipation elements 13 can be connected to the housing 31 such that a heat flow can be dissipated from the cell arrangement 3 to the housing 31. The housing 31 is firmly connected to a mounting plate 32, which serves as a heat sink. The housing 31 is closed at two ends by pressure plates 25. The pressure plates 25 have cooling fins 33, such that the pressure plates 25 help to cool the cell arrangement 3 inside the housing 31. Tension elements, which are not shown, are passed through the pressure plates 25 and screwed to the pressure plates 25 by means of nuts 34.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A board for electrically secured connection of battery cells,
   wherein the board is partially formed from a non-electrically conductive material,
   wherein the board has at least two electrically and thermally conductive contacting sections on a first side and at least one electrically and thermally conductive contacting section on a second side, wherein the non-electrically conductive material is planar and arranged between the contacting sections,
   wherein on the first side, an electrically and thermally conductive connecting section is arranged, which electrically and thermally conductively connects the contacting sections to one another on the first side,
   wherein an electrical fuse is assigned to each of the contacting sections on the first side and the connecting section is connected to each contacting section via an electrical fuse assigned to this contacting section, and
   wherein the connecting section is electrically conductively connected to the at least one contacting section on the second side of the board through the non-conductive material of the board via an electrically conductive lead-through element, so that each contacting section on the first side of the board is secured against each other contacting section on the first side of the board and against each contacting section on the second side of the board by at least one electrical fuse.

2. The board according to claim 1, wherein each contacting section on the first side of the board is separated from the connecting section by a non-electrically conductive section on the first side of the board and is connected to the connecting section by a conductor track passing through the non-electrically conductive section, the conductor track being dimensioned such that the conductor track serves as the fuse assigned to the respective contacting section.

3. The board according to claim 1, wherein the connecting section is formed as an planar, electrically and thermally conductive layer on the first side of the board.

4. The board according to claim 1, wherein the connecting section is formed as a composite of conductor tracks which are electrically and thermally conductively connected to one another.

5. The board according to claim 4, wherein each conductor track is configured as a closed conductor loop enclosing a contacting section.

6. The board according to claim 1, wherein the at least one contacting section is arranged on the second side of the board in an planar, electrically and thermally conductive connecting and contacting region on the second side of the board.

7. The board according to claim 6, wherein the connecting section on the first side is electrically and thermally conductively connected to the connecting and contacting region on the second side through the electrically non-conductive material.

8. The board according to claim 1, wherein around each contacting section on the first side, a plurality of lead-through elements are arranged uniformly spaced apart from the contacting section.

9. The board according to claim 1, wherein the at least one lead-through element is arranged on an inner edge of a lead-through recess which passes through the non-conductive material.

10. The board according to claim 1, wherein the contacting sections on the first side and/or on the second side of the board are elevated with respect to a plane defined by a surface of the first side or the second side of the board, respectively.

11. The board according to claim 1, wherein the contacting sections have elevated contacting points.

12. The board according to claim 1, wherein the board is flexible.

13. The board according to claim 1, wherein the board has, in the non-conductive material, a planar core formed from an electrically and thermally conductive material,
   wherein the lead-through element extends through the core and is electrically insulated from the core, so that an electrically and thermally conductive connection of the contacting sections on the first side with the contacting sections on the second side is made by the lead-through element and a heat flow can be picked up through the core and dissipated from the board.

14. A board for electrically secured connection of battery cells,
   wherein the board is partially formed from a non-electrically conductive material,
   wherein the board has at least two electrically and thermally conductive contacting sections on a first side and at least one electrically and thermally conductive contacting section on a second side, wherein the non-electrically conductive material is planar and arranged between the contacting sections, wherein on the first side, an electrically and thermally conductive connecting section is arranged, which electrically and thermally conductively connects the contacting sections to one another on the first side, wherein an electrical fuse is assigned to each of the contacting sections on the first side and the connecting section is connected to each contacting section via an electrical fuse assigned to this contacting section, wherein the connecting section is electrically conductively connected to the at least one contacting section on the second side of the board through the non-conductive material of the board via an electrically conductive lead-through element, so that each contacting section on the first side of the board is secured against each other contacting section on the first side of the board and against each contacting section on the second side of the board by at least one electrical fuse, wherein the board has, in the non-conductive material, a planar core formed from an electrically and thermally conductive material, wherein the lead-through element extends through the core and is electrically insulated from the core, so that an electrically and thermally conductive connection of the contacting sections on the first side with the contacting sections on the second side is made by the lead-through element and a heat flow can be picked up through the core and dissipated from the board, and wherein the core is at east in sections led out of an edge of the board or is exposed on the edge.

15. A battery having a cell arrangement, wherein the cell arrangement comprises a plurality of battery cells, which are electrically and thermally conductively connected to each in an electrical and thermal series and parallel circuit, wherein the cell arrangement comprising at least two battery sections, each battery section consisting of a plurality of battery cells electrically connected in parallel, wherein each battery cell has a positive and a negative end terminal, the battery cells of the battery sections are aligned such that all the positive end terminals of the battery cells of the respective battery section lie in a common positive contact plane, and that all the negative end terminals of the battery cells of the respective battery section lie in a common negative contact plane, wherein the battery sections are arranged adjacent to one another, wherein in each case a positive contact plane of a battery section faces a negative contact plane of an adjacently arranged battery section, and wherein the contact planes are aligned parallel to one another, wherein an at least partially electrically and thermally conductive connecting plate with a first side and a second side is arranged between at least two successive battery sections, which has on the first side and on the second side in each case thermally and electrically conductive contacting sections, wherein the end terminals connected to the contacting sections of the first side are electrically and thermally conductively connected to one another via the connecting plate, wherein the end terminals connected to the contacting sections of the second side being electrically and thermally conductively connected to one another via the connecting plate, wherein the end terminals connected to the contacting sections of the first side are electrically and thermally conductively connected to the end terminals connected to the contacting sections of the second side via the connecting plate, and wherein the connecting plate is configured as a board according to claim 1.

* * * * *

UNITED STATES PATENT AND TRADEMARK OFFICE
CERTIFICATE OF CORRECTION

PATENT NO. : 10,910,623 B2  
APPLICATION NO. : 16/401982  
DATED : February 2, 2021  
INVENTOR(S) : Thomas Krämer Page 1 of 1

It is certified that error appears in the above-identified patent and that said Letters Patent is hereby corrected as shown below:

In the Claims

Column 13, Line 27, Claim 14, reads "wherein the core is at east in sections led out of an edge" but should read --wherein the core is at least in sections led out of an edge--.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*